(12) United States Patent
Ortiz

(10) Patent No.: US 6,398,167 B1
(45) Date of Patent: Jun. 4, 2002

(54) AIRCRAFT BRAKING SYSTEM

(76) Inventor: Eddie Ortiz, 1425 Cherry Ave. #172, Beaumont, CA (US) 92223

( * ) Notice: Subject to any disclaimer, the term of this patent is extended or adjusted under 35 U.S.C. 154(b) by 0 days.

(21) Appl. No.: 09/609,684

(22) Filed: Jul. 3, 2000

Related U.S. Application Data

(60) Provisional application No. 60/141,939, filed on Jul. 1, 1999.

(51) Int. Cl.[7] .............................. B64C 9/32; B64D 17/80

(52) U.S. Cl. ........................................ 244/201; 244/113

(58) Field of Search .............................. 244/75 R, 113, 244/201, 204

(56) References Cited

U.S. PATENT DOCUMENTS

| | | | | |
|---|---|---|---|---|
| 1,834,149 A | * | 12/1931 | Goddard | |
| 3,511,453 A | * | 5/1970 | Giragosian | |
| 4,699,333 A | * | 10/1987 | Pinson | |
| 4,917,333 A | * | 4/1990 | Murri | |
| 4,979,699 A | * | 12/1990 | Tindell | |

* cited by examiner

Primary Examiner—Charles T. Jordan
Assistant Examiner—T. Dinh
(74) Attorney, Agent, or Firm—Goldstein Law Offices, P.C.

(57) ABSTRACT

An aircraft braking system including a port formed in a side of an airplane. The port has an openable door disposed therein. The openable door is in operative communication with a computerized hydraulic system of the airplane whereby the openable door will open once the airplane begins a turn and will not close until the turn is complete.

1 Claim, 1 Drawing Sheet

AIRCRAFT BRAKING SYSTEM

CROSS REFERENCES AND RELATED SUBJECT MATTER

This application relates to subject matter contained in provisional patent application Ser. No. 60/141,939, filed in the United States Patent & Trademark Office on Jul. 1, 1999.

BACKGROUND OF THE INVENTION

The present invention relates to an aircraft braking system and more particularly pertains to reducing g-force pull on a pilot of an airplane to allow for greater maneuverability.

The use of braking systems for airplanes is known in the prior art. More specifically, braking systems for airplanes heretofore devised and utilized for the purpose of reducing the speed of an airplane during flight are known to consist basically of familiar, expected and obvious structural configurations, notwithstanding the myriad of designs encompassed by the crowded prior art which have been developed for the fulfillment of countless objectives and requirements.

While these devices fulfill their respective, particular objective and requirements, these patents do not describe an aircraft braking system for reducing g-force pull on a pilot of an airplane to allow for greater maneuverability.

In this respect, the aircraft braking system according to the present invention substantially departs from the conventional concepts and designs of the prior art, and in doing so provides an apparatus primarily developed for the purpose of reducing g-force pull on a pilot of an airplane to allow for greater maneuverability.

Therefore, it can be appreciated that there exists a continuing need for new and improved aircraft braking system which can be used for reducing g-force pull on a pilot of an airplane to allow for greater maneuverability. In this regard, the present invention substantially fulfills this need.

SUMMARY OF THE INVENTION

In the view of the foregoing disadvantages inherent in the known types of braking systems for airplanes now present in the prior art, the present invention provides an improved aircraft braking system. As such, the general purpose of the present invention, which will be described subsequently in greater detail, is to provide a new and improved aircraft braking system and method which has all the advantages of the prior art and none of the disadvantages.

To attain this, the present invention essentially comprises a port formed in a side of an airplane. The port has an openable door disposed therein. The openable door is in operative communication with a computerized hydraulic system of the airplane whereby the openable door will open once the airplane begins a turn and will not close until the turn is complete.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved aircraft braking system which has all the advantages of the prior art braking systems for airplanes and none of the disadvantages.

It is another object of the present invention to provide a new and improved aircraft braking system which may be easily and efficiently manufactured and marketed.

It is a further object of the present invention to provide a new and improved aircraft braking system which is of durable and reliable construction.

An even further object of the present invention is to provide a new and improved aircraft braking system which is susceptible of a low cost of manufacture with regard to both materials and labor, and which accordingly is then susceptible of low prices of sale to the consuming public, thereby making such an aircraft braking system economically available to the buying public.

Even still another object of the present invention is to provide a new and improved aircraft braking system for reducing g-force pull on a pilot of an airplane to allow for greater maneuverability.

Lastly, it is an object of the present invention to provide a new and improved aircraft braking system including a port formed in a side of an airplane. The port has an openable door disposed therein. The openable door is in operative communication with a computerized hydraulic system of the airplane whereby the openable door will open once the airplane begins a turn and will not close until the turn is complete.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 1:
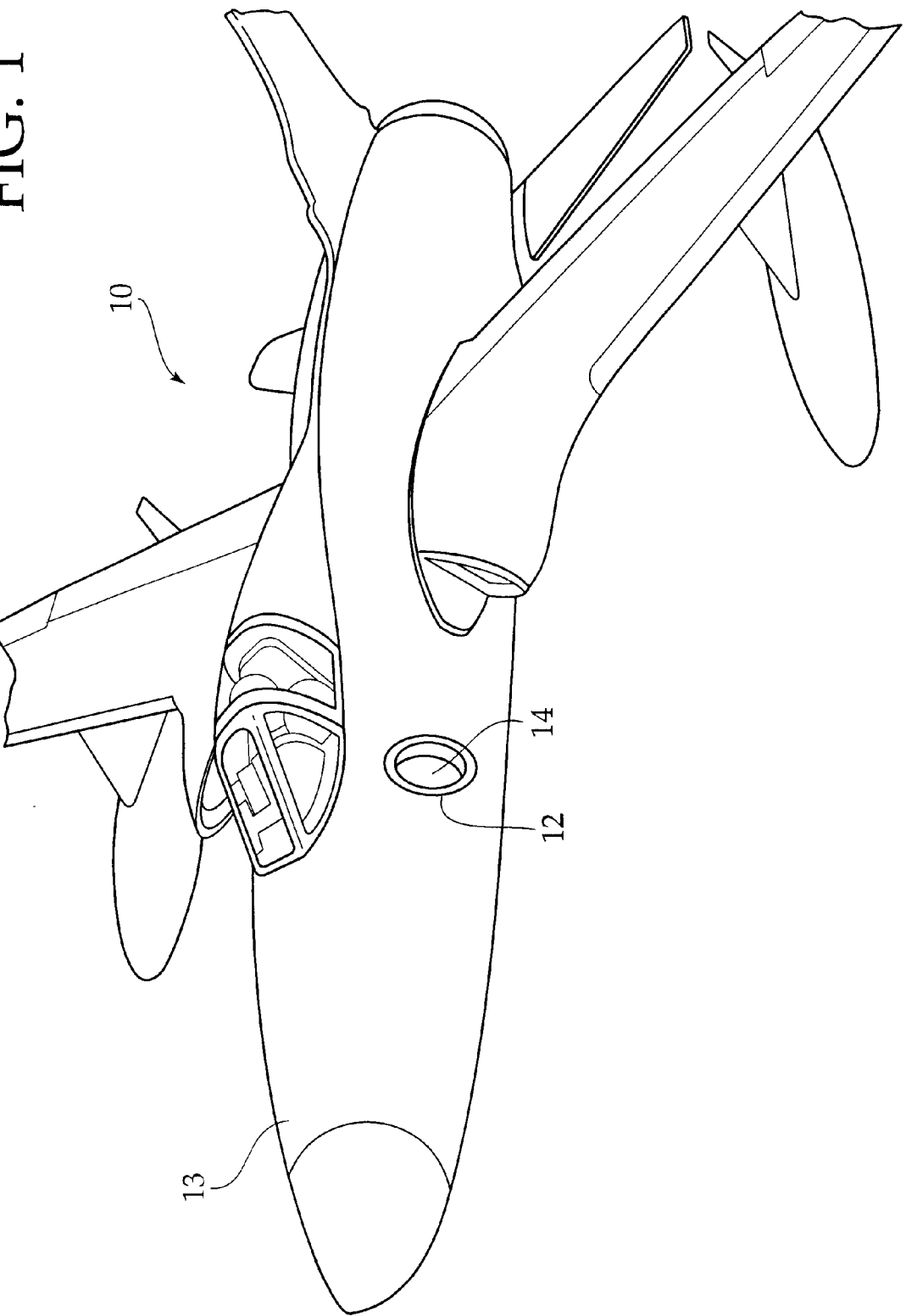
FIG. 1 is a perspective view of the preferred embodiment of the aircraft braking system constructed in accordance with the principles of the present invention.

With reference now to the drawings, and in particular, to FIG. 1 thereof, the preferred embodiment of the new and improved aircraft braking system embodying the principles and concepts of the present invention and generally designated by the reference number 10 will be described.

Specifically, it will be noted in the various Figures that the device relates to a aircraft braking system for reducing g-force pull on a pilot of an airplane to allow for greater maneuverability. In its broadest context, the device consists of. Such components are individually configured and correlated with respect to each other so as to attain the desired objective.

The present invention is essentially comprised of a port 12 formed in a side of an airplane 13. The port 12 is positioned below the cockpit of the airplane 13 so as to be centrally located with respect to the airplane 13. The port 12 has an openable door 14 disposed therein. The openable door 14 is in operative communication with a computerized hydraulic system of the airplane 13 whereby the openable door 14 will open once the airplane 13 begins a turn and will not close until the turn is complete. With the openable door 14 in the open orientation, the degree of g-force will be significantly reduced thereby allowing for the turn to be accomplished in an easier manner. The openable door 14 will open between 0 degrees and 90 degrees.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. An aircraft braking system for reducing g-force pull on a pilot of an airplane to allow for greater maneuverability comprising, in combination:

a port formed coplanar in a side of an airplane, the port having an openable door disposed therein, the openable door being in operative communication with a computerized hydraulic system of the airplane whereby the openable door will open once the airplane begins a turn and will not close until the turn is complete.

\* \* \* \* \*